J. G. VALLENTINE.
APPARATUS FOR WEIGHING LIQUIDS.
No. 190,262. Patented May 1, 1877.
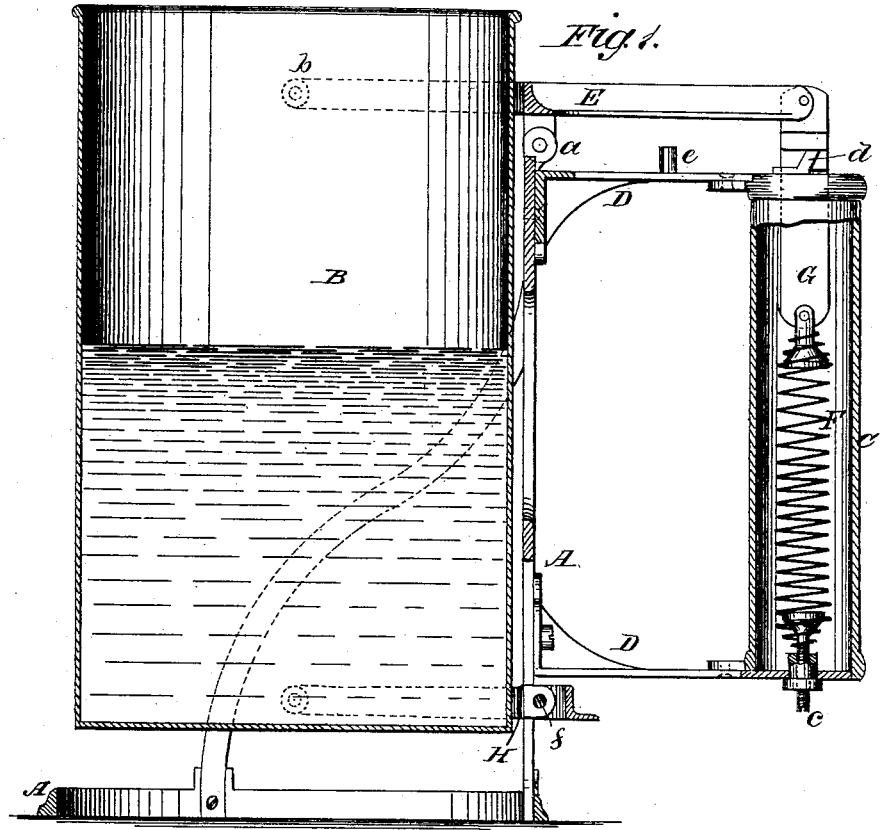
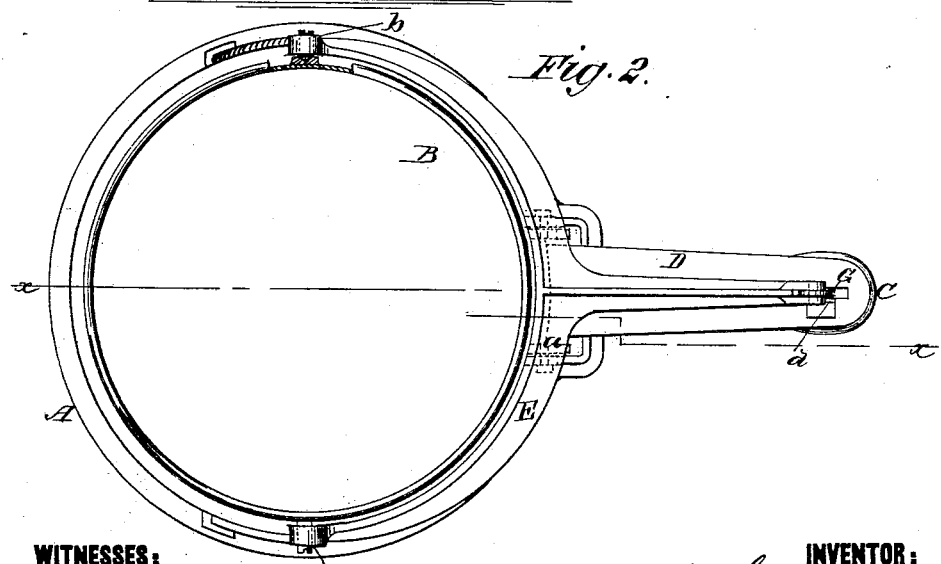
WITNESSES:
Francis McArdle
J. H. Scarborough
INVENTOR:
J. G. Vallentine
BY
Munn
ATTORNEYS.

UNITED STATES PATENT OFFICE.

JOHN G. VALLENTINE, OF FLORENCE, MASSACHUSETTS, ASSIGNOR TO HIMSELF AND EDWARD VALLENTINE, OF SAME PLACE.

IMPROVEMENT IN APPARATUS FOR WEIGHING LIQUIDS.

Specification forming part of Letters Patent No. 190,262, dated May 1, 1877; application filed February 26, 1877.

*To all whom it may concern:*

Be it known that I, JOHN G. VALLENTINE, of Florence, in the county of Hampshire and State of Massachusetts, have invented a new and Improved Apparatus for Weighing Liquids, of which the following is a specification:

Figure 1 is a vertical section on line $x\ x$ in Fig. 2. Fig. 2 is a plan view.

Similar letters of reference indicate corresponding parts.

My invention consists in a receptacle for liquids, that is suspended from a scale-lever pivoted in a frame, in the handle of which is placed a spring connected by a scale with the said lever, for indicating the weight of liquids contained by the receptacle.

The object of the invention is to accurately measure or weigh foamy liquids, such as beer, ale, &c.

In the drawing, A is a frame adapted to the receptacle B, and provided with an annular base-piece, and with a tubular handle, C, which is attached to the frame A by brackets D. E is a forked lever, pivoted to the frame A at $a$, and to the sides of the receptacle B at $b$. In the tubular handle C a spring, F, is placed, the lower end of which is secured to the head of a bolt, $c$, which runs through the lower end of the handle, the nut of which is placed outside of, and against, the lower end of the handle C. The upper end of the spring F is attached to a button, which is jointed to the lower end of a scale, G, which extends upward through a slot in the upper end of the handle C, and is pivoted to the outer end of the lever E. The scale G is graduated as may be required, and a fixed index, $d$, is attached to the top of the handle C. A stop, $e$, projects upward from the upper bracket D, upon which the outer arm of the lever E rests when the receptacle B is empty. H is a forked arm, pivoted to the frame A at $f$, and also centrally to the sides of the receptacle B. This arm serves to guide the lower end of the receptacle. When the receptacle B is wholly or partly filled, the weight of the contained liquid is indicated by the graduation of the scale G, that is opposite the index $d$. The measure is thus indicated by the weight, irrespective of bulk, so that a foaming liquid may be as accurately measured as one having no foam.

Having thus described my invention, I claim as new and desire to secure by Letters Patent—

1. The combination of the frame A, having the tubular handle C, spring F, scale G, lever E, and receptacle B, substantially as herein shown and described.

2. The combination of the arm H, frame A, and receptacle B, substantially as shown and described.

JOHN G. VALLENTINE.

Witnesses:
 ORAM STORER,
 C. F. S. O'NEILL.